(12) United States Patent
Chen et al.

(10) Patent No.: US 11,144,722 B2
(45) Date of Patent: Oct. 12, 2021

(54) TRANSLATION OF A CONTENT ITEM

(71) Applicant: INTERNATIONAL BUSINESS MACHINES CORPORATION, Armonk, NY (US)

(72) Inventors: Jim Chun-Ta Chen, Rochester, MN (US); Rafal Konik, Oronoco, MN (US); Yi Jie Ma, Beijing (CN); Wen Yan Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 16/386,301

(22) Filed: Apr. 17, 2019

(65) Prior Publication Data
US 2020/0334329 A1    Oct. 22, 2020

(51) Int. Cl.
*G06F 40/263* (2020.01)
*G06F 40/247* (2020.01)

(52) U.S. Cl.
CPC .......... *G06F 40/263* (2020.01); *G06F 40/247* (2020.01)

(58) Field of Classification Search
CPC ...... G06F 40/263; G06F 40/247; G06F 40/00; G06F 40/10; G06F 40/103; G06F 40/151; G06F 40/154; G06F 40/157; G06F 40/166; G06F 40/20; G06F 40/205; G06F 40/211; G06F 40/237; G06F 40/242; G06F 40/274; G06F 40/279; G06F 40/284; G06F 40/289; G06F 40/40; G06F 40/42; G06F 40/44; G06F 40/45; G06F 40/47; G06F 40/49; G06F 40/51; G06F 40/55; G06F 40/56; G06F 40/58; G10L 13/086; G10L 13/08; G10L 15/005; G10L 15/26

See application file for complete search history.

(56) References Cited

U.S. PATENT DOCUMENTS

| 2003/0040899 A1* | 2/2003 | Ogilvie | G06F 40/58 704/2 |
| 2006/0019223 A1* | 1/2006 | Wood | G09B 19/00 434/156 |

(Continued)

OTHER PUBLICATIONS

Mell et al. "The NIST Definition of Cloud Computing", NIST, U.S. Dept. Commerce; Special Publication 800-145; Sep. 2011; 7 pgs.

*Primary Examiner* — Andrew C Flanders
(74) *Attorney, Agent, or Firm* — Cantor Colburn LLP; David Quinn (57) ABSTRACT

Embodiments of the present invention are directed to a computer-implemented method for translating a content item. Aspects include obtaining a user profile for a reader of the content item, the user profile comprising a native language of the reader, a second language of the reader and skill level associated with the second language. Aspects also include obtaining the content item, wherein the content item is in the second language. Aspects further include creating a translated content item by determining, for each phrase in the content item, a confidence score that the reader will understand the phrase based at least in part on the user profile and replacing each phrase in the content item having the confidence score less than a threshold level with an alternate phrase. Aspects also include presenting the translated content item to the reader.

18 Claims, 4 Drawing Sheets

(56) References Cited

U.S. PATENT DOCUMENTS

| | | | |
|---|---|---|---|
| 2007/0016401 A1* | 1/2007 | Ehsani | G10L 15/005 704/9 |
| 2008/0059145 A1* | 3/2008 | Wood | G09B 19/06 704/2 |
| 2009/0138791 A1* | 5/2009 | Kamada | G06F 16/337 715/230 |
| 2009/0248392 A1* | 10/2009 | Talwar | H04L 51/063 704/3 |
| 2009/0306959 A1* | 12/2009 | Rappoport | G09B 7/02 704/2 |
| 2013/0090914 A1* | 4/2013 | White | G06F 3/0688 704/2 |
| 2013/0323693 A1 | 12/2013 | Gandhe et al. | |
| 2015/0046147 A1* | 2/2015 | Waibel | G10L 15/22 704/2 |
| 2016/0019816 A1 | 1/2016 | Parry et al. | |
| 2016/0162478 A1* | 6/2016 | Blassin | G06Q 10/06311 706/12 |
| 2017/0017642 A1* | 1/2017 | Cunningham | G06F 40/58 |
| 2017/0132208 A1* | 5/2017 | Adavelli | G06F 40/242 |
| 2018/0151087 A1* | 5/2018 | Wise | G09B 19/06 |
| 2019/0213915 A1* | 7/2019 | Tan | G06F 40/42 |
| 2019/0385481 A1* | 12/2019 | Nielson | G06F 40/263 |
| 2020/0007946 A1* | 1/2020 | Olkha | H04N 21/25891 |
| 2020/0196022 A1* | 6/2020 | Sen | G06F 40/247 |

* cited by examiner

TRANSLATION OF A CONTENT ITEM

BACKGROUND

The present invention generally relates to translating text and more specifically, to translating a content item based on a reader's experience and ability.

The ability to speak multiple languages is a very valuable asset in a world that is becoming smaller due to technology. However, a person's ability to read and understand a language, other than their native language, varies greatly. In some cases, two people reading an article in a non-native language, or language they are learning, may have a different understanding of that article based on their comprehension and control of that new language. While systems are readily available that can translate the article into their native language, translating the whole article into their native language may defeat the purpose of learning another language. Conversely, repeatedly looking up words that the reader does not understand will slow down the reader and can result in increased frustration with the reading experience.

SUMMARY

Embodiments of the present invention are directed to a computer-implemented method for translating a content item. A non-limiting example of the computer-implemented method includes translating a content item. The method includes obtaining a user profile for a reader of the content item, the user profile comprising a native language of the reader, a second language of the reader and skill level associated with the second language. The method also includes obtaining the content item, wherein the content item is in the second language. The method also includes creating a translated content item by determining, for each phrase in the content item, a confidence score that the reader will understand the phrase based at least in part on the user profile and replacing each phrase in the content item having the confidence score less than a threshold level with an alternate phrase. The method also includes presenting the translated content item to the reader.

Embodiments of the present invention are directed to a system for translating a content item. A non-limiting example of the system includes a processor and a memory communicatively coupled to the processor. The memory has stored therein instructions that when executed cause the processor to obtain a user profile for a reader of the content item, the user profile comprising a native language of the reader, a second language of the reader and skill level associated with the second language. The memory has stored therein instructions that when executed cause the processor to obtain the content item, wherein the content item is in the second language. The memory has stored therein instructions that when executed cause the processor to create a translated content item by determining, for each phrase in the content item, a confidence score that the reader will understand the phrase based at least in part on the user profile and replacing each phrase in the content item having the confidence score less than a threshold level with an alternate phrase. The memory has stored therein instructions that when executed cause the processor to present the translated content item to the reader.

Embodiments of the invention are directed to a computer program product for translating a content item, the computer program product comprising a computer readable storage medium having program instructions embodied therewith. The program instructions are executable by a processor to cause the processor to perform a method. A non-limiting example of the method includes obtaining a user profile for a reader of the content item, the user profile comprising a native language of the reader, a second language of the reader and skill level associated with the second language. The method also includes obtaining the content item, wherein the content item is in the second language. The method also includes creating a translated content item by determining, for each phrase in the content item, a confidence score that the reader will understand the phrase based at least in part on the user profile and replacing each phrase in the content item having the confidence score less than a threshold level with an alternate phrase. The method also includes presenting the translated content item to the reader.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
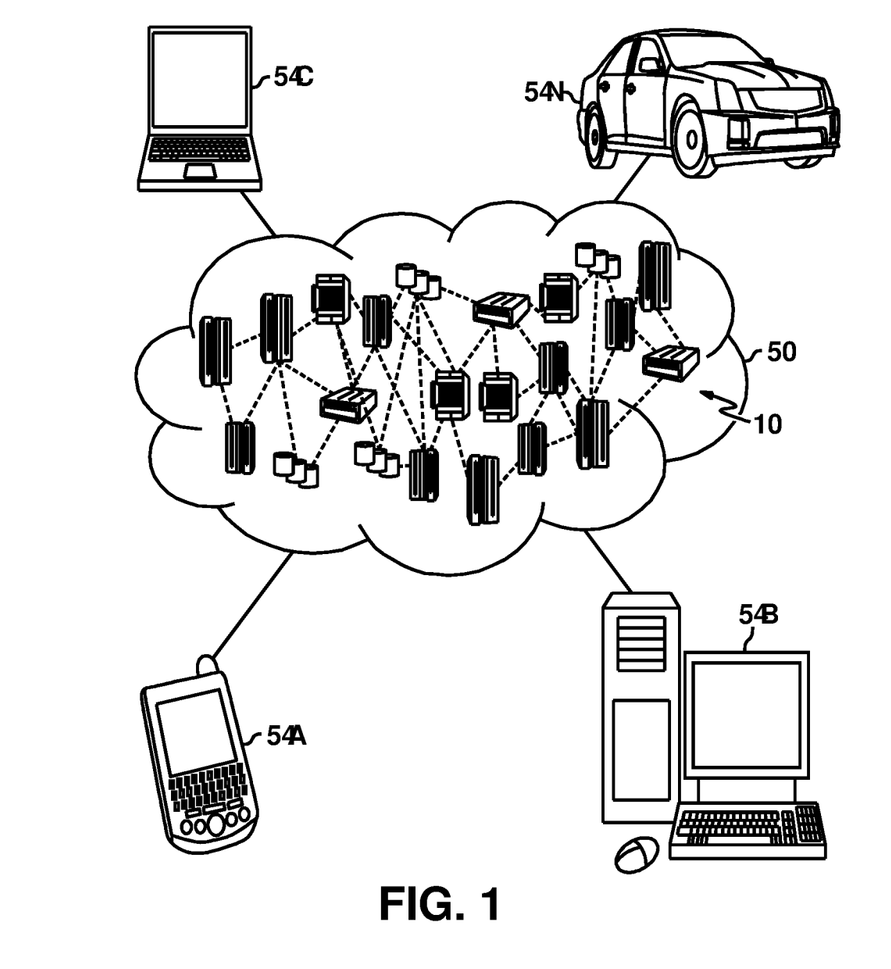
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
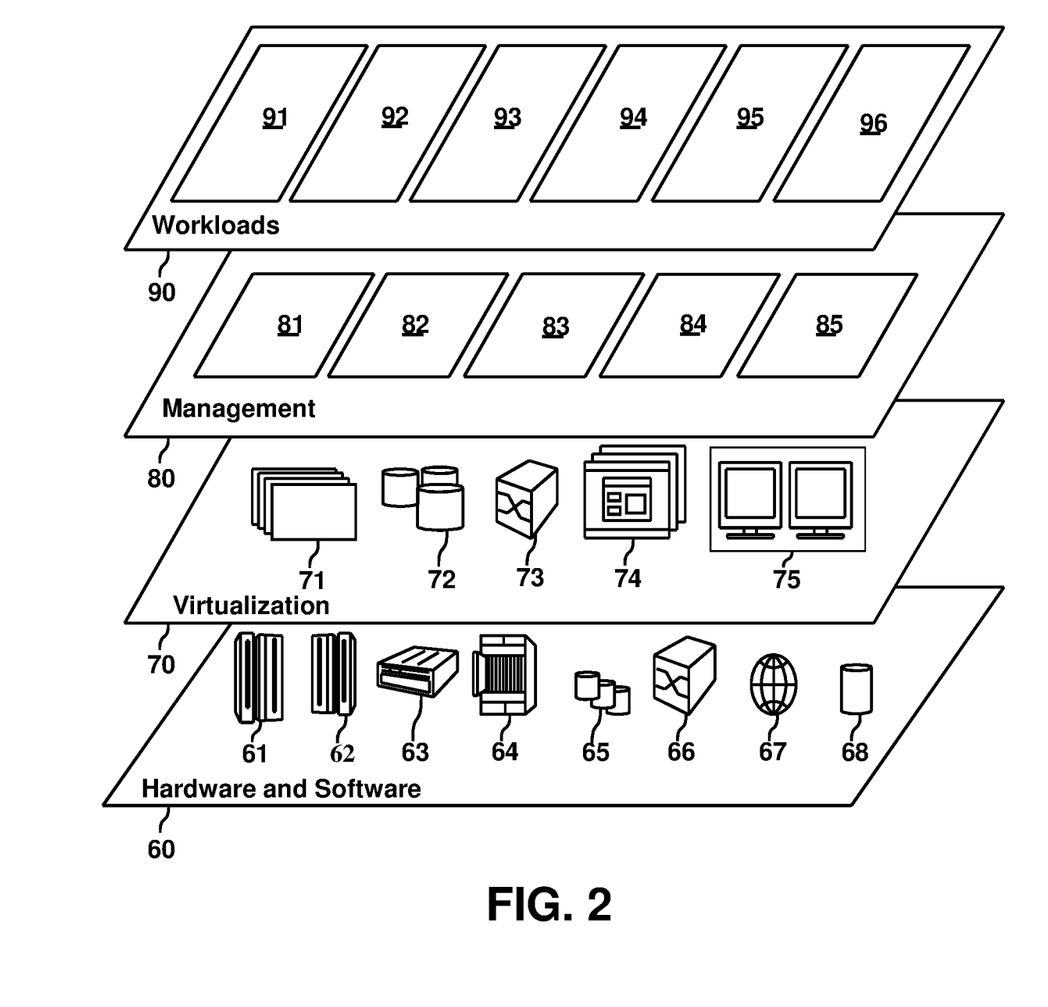
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; CAN processing 95; and text processing and translation 96.

Figure 3:
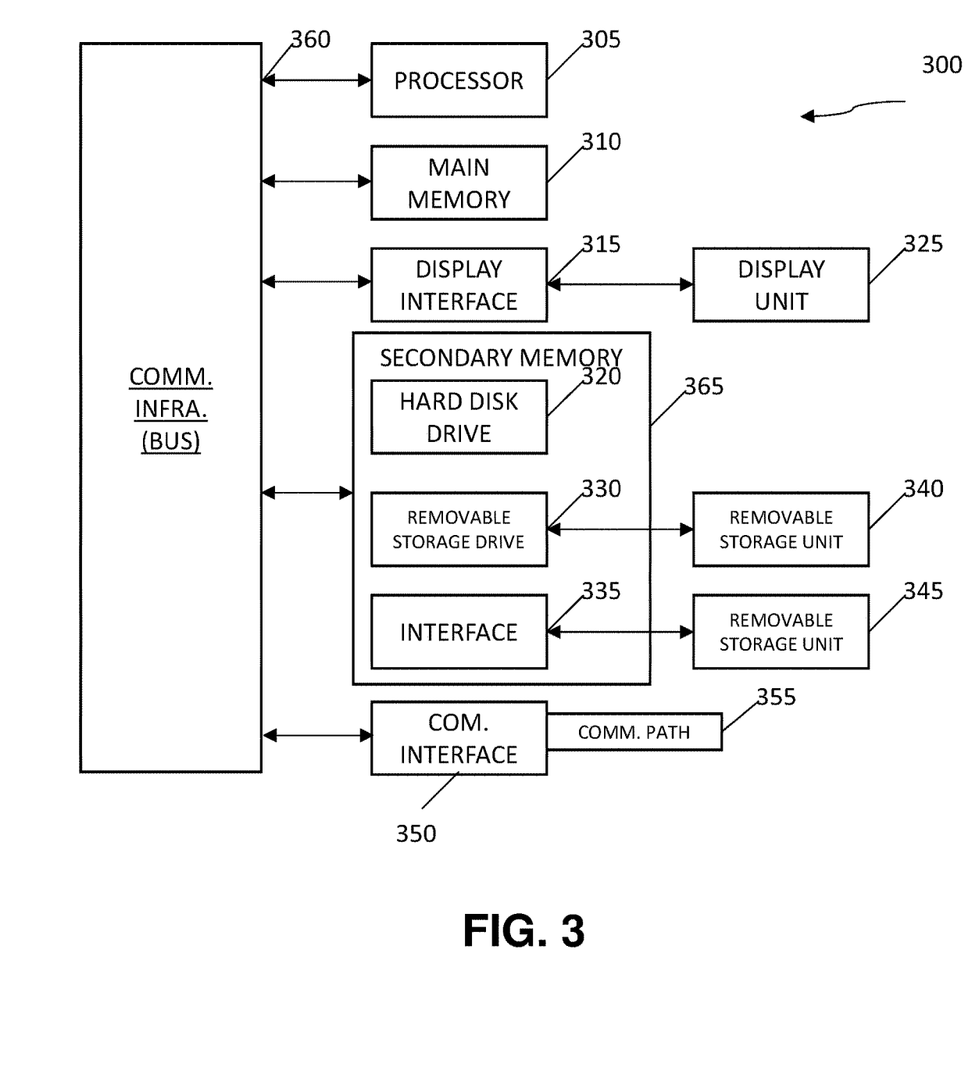
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, methods, systems and computer program products for translating a content item based on the abilities of a reader are provided. In exemplary embodiments, when a reader accesses a content item in a language other than their native language, the content item will be processed and presented to the reader in the non-native language based on the reader's ability to understand the non-native language. In exemplary embodiments, the reader's ability to understand a non-native language is stored in a user profile of the user. In one embodiment, a machine learning system is configured to learn the individual user's ability based on observing the user's attempt to read in their non-native language. In another embodiment, a user can provide an assessment of their ability and that assessment can be used in combination with a knowledge-base from a pool of similarly skilled users. In exemplary embodiments, the knowledge-base can be collected and collated by geography or language of the reader, which would account for regional statistical anomalies between countries that speak the same language. For example, for a Spanish speaker in Mexico the translation system will preferably analyze and compare their skills/profiles with other Mexicans versus Spanish speakers from Spain or all Spanish speakers worldwide.

The processing of the content item includes analyzing the content item and determining a confidence score that the reader will understand the words and phrases in the content item. Based on a determination that the reader is unlikely to understand a word or phase in the content item, the word or phrase is replaced with an alternate word or phrase. The alternate word or phrase can include, but are not limited to, their equivalents in the reader's native language (i.e., a literal translation in to the reader's native language), a broader easier word/phrase in the foreign language, and a native analog (i.e., a non-literal translation in to the reader's native language). In exemplary embodiments, the choice of the alternate word/phrase is determined based on the user profile.

Figure 4:
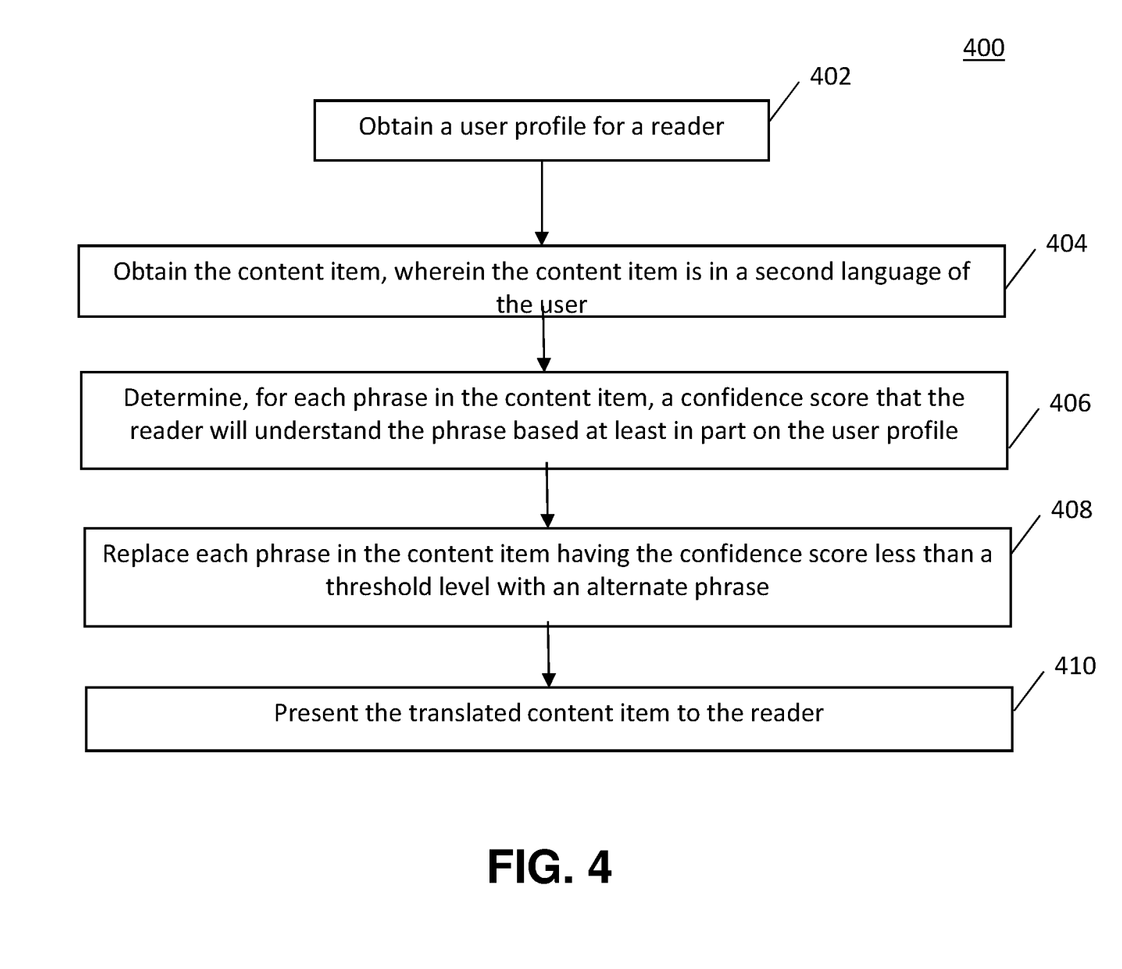
FIG. 4 depicts a flow diagram of a method for translating a content item in accordance with an embodiment of the present invention.

Referring now to FIG. 4, a flow diagram of a method 400 for providing an advertisement free copy of a video to a user in accordance with an embodiment of the present invention is shown. As illustrated at block 402, the method 400 includes obtaining a user profile for a reader of the content item. In exemplary embodiments, the user profile includes a native language of the reader and a second language of the reader. The user profile also includes a skill level associated with the second language. Next, as shown at block 404, the method 400 includes obtaining the content item, the content item being written in the second language of the reader. The method 400 also includes determining, for each phrase in the content item, a confidence score that the reader will understand the phrase based at least in part on the user profile, as shown at block 406. Next, as shown at block 408, the method 400 includes replacing each phrase in the content item having the confidence score less than a threshold level with an alternate phrase. The method 400 concludes at block 410 by presenting the translated content item to the reader. In exemplary embodiments, the translated content item includes an indication of when an alternate phrase was used to replace a word or phrase, the indication may include presenting the alternate phrase in a different format from the other text, i.e., underlined, italicized, or in a different font. Furthermore, the reader can optionally display the word or phrase that was replaced by clicking on the alternate phrase.

In exemplary embodiments, the threshold level is obtained from the user profile and the threshold level is configurable by the reader. As a result, the reader can determine how aggressive the translation system should be. In other words, how often would the reader like to be presented with a phrase that they are not likely to understand. In addition, the user profile includes the preferences of how the user would like the alternate phrase to be determined. In various embodiments, the alternate phrase is selected to be one of: a translation of the phrase in the native language; a synonym of the phrase in the second language, wherein the synonym has a confidence score greater than the threshold level; a generic term associated with the phrase in the second language, wherein the generic term has a confidence score greater than the threshold level; and a cultural analog of the phrase in the native language. In exemplary embodiments, the phrase can include one or more words.

In exemplary embodiments, a statistical analysis is performed on each language to classify the words of the language into different levels of difficulty based upon how common each word is. This information regarding the difficulty of the various words is combined with the knowledge of the user's ability level in a language to determine which words and phrases that the user is likely to understand. In one embodiment, the knowledge of the user's ability level in a language is obtained during a learning stage in which a user reads articles and identifies the words they do not know. The words that the user does not know are tracked and a profile of the user's knowledge of the language is built.

Once the learning stage has been completed, the translation system will dynamically and automatically perform translations whenever the user is viewing content in their non-native language. In one embodiment, the translation system can be embodied on a computer system 300, such as the one shown in FIG. 3, which a user is using to read the content item. In another embodiment, the translation system can be embodied in a cloud-based computing system, such as the one shown in FIGS. 1 and 2, when the user is utilizing a web-browser or other application to view content items online.

In one embodiment, the translation system analyzes a content item accessed by a user to identify words/phrases that the user will likely not know based on history and language ability. For every word the translation system assigns a confidence score, based on that user's profile, that they will understand the word. The translation system will determine whether to replace a word based on the confidence score and a threshold that is set by the user. For example, the user could set 25% as the threshold and any word that the system detects and predicts that there is less than 25% confidence that the user will know that word will be identified and replaced.

In exemplary embodiments, a user may configure the translation system to replace a word or phrase that they are unlikely to know with several possible alternate phrases. A few examples will be discussed below, for these examples the reader is a native Spanish speaker and is learning English and is viewing English content. For the following examples, the original sentence is "The man was walking his mastiff" and the reader is unlikely to know the word mastiff. In one embodiment, the translation system replaces the word mastif with mastin, which is the Spanish, or native language, translation of mastif. In this embodiment, the sentence displayed would be "The man was walking his mastin." In another embodiment, the translation system replaces the word mastif with dog, which is a broader word for mastif because a mastif is a type of dog. In this embodiment, the sentence displayed would be "The man was walking his dog." In exemplary embodiments, if the user hovers over the alternate word (mastin or dog), the native text would show up in a bubble so they can learn the translation. In this case, the word mastif would be shown.

In another example, a native English speaker is reading a Spanish article and the reader knows a lot of words in Spanish and easily can translate each word in the sentence below. But the English translation he finds peculiar, the phrase is in fact culturally unique. The original sentence is "En boca cerrada no entran moscas" which has a literal English translation of "Flies don't enter a closed mouth". In this case, the words are all translated correct but that combination does not make sense to the reader. The translation system is configured to replace the phrase "En boca cerrada no entran moscas" with the English cultural analog "Sometimes it's best to keep your mouth shut." In exemplary embodiments, the translation system includes a database of cultural analog phrases that is created and updated based on input from advanced speakers of both languages.

In one example, a native Russian speaker is reading an English language article and sees the following sentence "They reported several Canadian Honkers by the lake." Over time, the translation system has collected information that every Russian reader, regardless of their skills in English, had to look up "Honker" and what it is. Accordingly, the translation system determines that there is a high probability this Russian reader will not know it either. As described above, the translation system can replace "Honker" with "Gus" in their native Russian, or replace it with "Goose" or "Bird" as a broader easier English word depending on their ability.

In exemplary embodiments, the translation system includes a database that includes a difficulty level associated with each word in a given language. In one embodiment, different difficulty levels are associated with each word of a language based on the native language of a reader. For example, an English word may have a first difficulty level for a native Spanish speaker and a second difficulty level for a native Russian speaker. The difficulty level for each word can be determined by monitoring how often non-native language readers look up the meaning of the words.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for translating a content item comprising:
    obtaining a user profile for a reader of the content item, the user profile comprising a native language of the reader, a second language of the reader and skill level associated with the second language;
    obtaining the content item, wherein the content item is in the second language;
    creating a translated content item by:
        determining, for each phrase in the content item, a confidence score that the reader will understand the phrase based at least in part on the user profile; and
        replacing each phrase in the content item having the confidence score less than a threshold level with an alternate phrase, wherein at least one of the replaced phrases is a cultural analog of the phrase in the native language, wherein the cultural analog is obtained from a database of cultural analog phrases that is created and updated based on input from advanced speakers of both the native and the second language; and
    presenting the translated content item to the reader, wherein the alternate phrase is presented using a different format from a remaining text of the translated content item and wherein the phrase that was replaced is displayed to the reader based upon the reader clicking on the alternate phrase,
    wherein the skill level associated with the second language is determined by a machine learning system observing the user's attempt to read in the second language.

2. The computer-implemented method of claim 1, wherein the user profile includes the threshold level and wherein the threshold level is configurable by the reader.

3. The computer-implemented method of claim 1, wherein the alternate phrase is a literal translation of the phrase in the native language.

4. The computer-implemented method of claim 1, wherein the alternate phrase is a synonym for the phrase in the second language, wherein the synonym has the confidence score greater than the threshold level.

5. The computer-implemented method of claim 1, wherein the alternate phrase is a generic term associated with the phrase in the second language, wherein the generic term has the confidence score greater than the threshold level.

6. The computer-implemented method of claim 1, wherein the phrase consists of a single word.

7. The computer-implemented method of claim 1, wherein determining the confidence score that the reader will understand the phrase is further based on a database that includes a difficulty level associated with each word.

8. A system comprising:
    a processor;
    a memory communicatively coupled to the processor, the memory having stored therein instructions that when executed cause the processor to:
    obtain a user profile for a reader of the content item, the user profile comprising a native language of the reader, a second language of the reader and skill level associated with the second language;
    obtain the content item, wherein the content item is in the second language;

create a translated content item by:
  determining, for each phrase in the content item, a confidence score that the reader will understand the phrase based at least in part on the user profile; and
  replacing each phrase in the content item having the confidence score less than a threshold level with an alternate phrase, wherein at least one of the replaced phrases is a cultural analog of the phrase in the native language, wherein the cultural analog is obtained from a database of cultural analog phrases that is created and updated based on input from advanced speakers of both the native and the second language; and
present the translated content item to the reader, wherein the alternate phrase is presented using a different format from a remaining text of the translated content item and wherein the phrase that was replaced is displayed to the reader based upon the reader clicking on the alternate phrase,
wherein the skill level associated with the second language is determined by a machine learning system observing the user's attempt to read in the second language.

9. The system of claim 8, wherein the user profile includes the threshold level and wherein the threshold level is configurable by the reader.

10. The system of claim 8, wherein the alternate phrase is a literal translation of the phrase in the native language.

11. The system of claim 8, wherein the alternate phrase is a synonym for the phrase in the second language, wherein the synonym has the confidence score greater than the threshold level.

12. The system of claim 8, wherein the alternate phrase is a generic term associated with the phrase in the second language, wherein the generic term has the confidence score greater than the threshold level.

13. The system of claim 8, wherein the phrase consists of a single word.

14. The system of claim 8, wherein determining the confidence score that the reader will understand the phrase is further based on a database that includes a difficulty level associated with each word.

15. A computer program product for translating a content item, the computer program product comprising a computer readable storage medium having program instructions embodied therewith, the program instructions executable by a processor to cause the processor to:
  obtain a user profile for a reader of the content item, the user profile comprising a native language of the reader, a second language of the reader and skill level associated with the second language;
  obtain the content item, wherein the content item is in the second language;
  create a translated content item by:
    determining, for each phrase in the content item, a confidence score that the reader will understand the phrase based at least in part on the user profile; and
    replacing each phrase in the content item having the confidence score less than a threshold level with an alternate phrase, wherein at least one of the replaced phrases is a cultural analog of the phrase in the native language, wherein the cultural analog is obtained from a database of cultural analog phrases that is created and updated based on input from advanced speakers of both the native and the second language; and
  present the translated content item to the reader, wherein the alternate phrase is presented using a different format from a remaining text of the translated content item and wherein the phrase that was replaced is displayed to the reader based upon the reader clicking on the alternate phrase,
  wherein the skill level associated with the second language is determined by a machine learning system observing the user's attempt to read in the second language.

16. The computer program product of claim 15, wherein the user profile includes the threshold level and wherein the threshold level is configurable by the reader.

17. The computer program product of claim 15, wherein the alternate phrase is a literal translation of the phrase in the native language.

18. The computer program product of claim 15, wherein the alternate phrase is a synonym for the phrase in the second language, wherein the synonym has the confidence score greater than the threshold level.

\* \* \* \* \*